United States Patent
Yamaguchi (10) Patent No.: US 7,966,030 B2
(45) Date of Patent: Jun. 21, 2011

(54) PUSH-TO-TALK OVER CELLULAR SYSTEM, PORTABLE TERMINAL, SERVER APPARATUS, POINTER DISPLAY METHOD, AND PROGRAM THEREOF

(75) Inventor: Yuuichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1012 days.

(21) Appl. No.: 11/795,143

(22) PCT Filed: Jan. 12, 2006

(86) PCT No.: PCT/JP2006/300675
§ 371 (c)(1),
(2), (4) Date: Jul. 12, 2007

(87) PCT Pub. No.: WO2006/075783
PCT Pub. Date: Jul. 20, 2006

(65) Prior Publication Data
US 2008/0139251 A1    Jun. 12, 2008

(30) Foreign Application Priority Data
Jan. 12, 2005   (JP) ................................ 2005-004622

(51) Int. Cl.
*H04B 1/38* (2006.01)
(52) U.S. Cl. ........ 455/518; 345/157; 345/160; 345/163; 345/173; 345/504
(58) Field of Classification Search .................... 455/518
See application file for complete search history.

(56) References Cited

U.S. PATENT DOCUMENTS

| | | | | |
|---|---|---|---|---|
| 3,351,714 A | * | 11/1967 | Kunzelman et al. | 455/561 |
| 5,222,137 A | * | 6/1993 | Barrett et al. | 380/271 |
| 5,363,507 A | * | 11/1994 | Nakayama et al. | 715/743 |
| 5,542,039 A | * | 7/1996 | Brinson et al. | 715/800 |
| 5,654,726 A | * | 8/1997 | Mima et al. | 345/2.2 |

(Continued)

FOREIGN PATENT DOCUMENTS
JP   08-237628   9/1996
(Continued)

OTHER PUBLICATIONS

Tomoharu Oota, 'Push to Talk' Service NEC ga Keitai Denwa ARPU Zodaisaku o Happyo, Telecommunication, Mar. 25, 2004, vol. 21, No. 4, pp. 68 to 69.

*Primary Examiner* — Yuwen Pan
*Assistant Examiner* — Hai V Nguyen
(74) *Attorney, Agent, or Firm* — McGinn IP Law, PLLC (57) ABSTRACT

The present invention provides a PoC portable terminal capable of performing edit and information addition on a display screen on which screen information relating to a group telephone conversation is displayed. When a push button of a key operation part 15 is pushed down, a portable terminal 1 becomes a master side. The portable terminal 1 displays pointer information of a marker, which is outputted by a pointing device part 18, on a display part 16. The portable terminal 1 transmits the pointer information from a radio part 14 to a PoC server. The PoC server sends the pointer information from the portable terminal 1 to other users' portable terminals in a group. If the pointer is moved, then the portable terminal 1 as a master side repeats the aforementioned processes.

19 Claims, 9 Drawing Sheets

U.S. PATENT DOCUMENTS

| | | | | |
|---|---|---|---|---|
| 5,724,106 | A * | 3/1998 | Autry et al. | 348/734 |
| 5,724,569 | A * | 3/1998 | Andres | 1/1 |
| 5,767,897 | A * | 6/1998 | Howell | 348/14.07 |
| 5,786,776 | A * | 7/1998 | Kisaichi et al. | 341/23 |
| 5,982,370 | A * | 11/1999 | Kamper | 715/760 |
| 6,057,831 | A * | 5/2000 | Harms et al. | 725/38 |
| 6,166,734 | A * | 12/2000 | Nahi et al. | 715/748 |
| 6,266,691 | B1 * | 7/2001 | Watanabe et al. | 709/204 |
| 6,297,802 | B1 | 10/2001 | Fujioka | 345/156 |
| 6,392,674 | B1 * | 5/2002 | Hiraki et al. | 715/857 |
| 6,490,634 | B2 * | 12/2002 | Coiner | 719/329 |
| 6,608,636 | B1 * | 8/2003 | Roseman | 715/753 |
| 6,643,377 | B1 * | 11/2003 | Takahashi et al. | 381/306 |
| 6,727,916 | B1 * | 4/2004 | Ballard | 715/758 |
| 6,763,226 | B1 * | 7/2004 | McZeal, Jr. | 455/90.2 |
| 6,952,592 | B2 * | 10/2005 | Dorenbosch | 455/518 |
| 7,020,650 | B2 * | 3/2006 | Sato et al. | 1/1 |
| 7,023,821 | B2 * | 4/2006 | Wotherspoon et al. | 370/329 |
| 7,047,195 | B2 * | 5/2006 | Koizumi et al. | 704/260 |
| 7,069,296 | B2 * | 6/2006 | Moller et al. | 709/203 |
| 7,171,448 | B1 * | 1/2007 | Danielsen et al. | 709/205 |
| 7,194,690 | B2 * | 3/2007 | Guillermo et al. | 715/736 |
| 7,203,509 | B2 * | 4/2007 | Gottschalk et al. | 455/518 |
| 7,209,966 | B2 * | 4/2007 | Schwartz et al. | 709/225 |
| 7,222,078 | B2 * | 5/2007 | Abelow | 705/1.1 |
| 7,251,675 | B1 * | 7/2007 | Kamakura et al. | 709/204 |
| 7,266,779 | B2 * | 9/2007 | Baek et al. | 715/778 |
| 7,313,522 | B2 * | 12/2007 | Fukuzato | 704/258 |
| 7,346,654 | B1 * | 3/2008 | Weiss | 709/204 |
| 7,359,497 | B2 * | 4/2008 | Morishima et al. | 379/202.01 |
| 7,398,294 | B2 * | 7/2008 | Florkey et al. | 709/204 |
| 7,421,069 | B2 * | 9/2008 | Vernon et al. | 379/204.01 |
| 7,433,179 | B2 * | 10/2008 | Hisano et al. | 361/679.27 |
| 7,454,763 | B2 * | 11/2008 | Veselova et al. | 719/329 |
| 7,489,772 | B2 * | 2/2009 | Szomolanyi et al. | 379/202.01 |
| 7,509,577 | B2 * | 3/2009 | Kuwata et al. | 715/256 |
| 7,519,917 | B2 * | 4/2009 | Lewis-Bowen et al. | 715/772 |
| 7,526,306 | B2 * | 4/2009 | Brems et al. | 455/518 |
| 7,542,068 | B2 * | 6/2009 | Eshkoli et al. | 348/14.08 |
| 7,561,672 | B2 * | 7/2009 | Lee | 379/88.03 |
| 7,620,413 | B2 * | 11/2009 | Jen | 455/518 |
| 7,620,900 | B2 * | 11/2009 | Kawashima et al. | 715/754 |
| 7,640,506 | B2 * | 12/2009 | Pratley et al. | 715/751 |
| 7,653,405 | B2 * | 1/2010 | Wu et al. | 455/519 |
| 7,664,514 | B2 * | 2/2010 | Morishima et al. | 455/456.3 |
| 7,668,901 | B2 * | 2/2010 | Franke et al. | 709/203 |
| 7,679,640 | B2 * | 3/2010 | Eshkoli et al. | 348/14.09 |
| 7,683,925 | B2 * | 3/2010 | Lee | 348/14.01 |
| 7,714,802 | B2 * | 5/2010 | Hurley et al. | 345/2.1 |
| 7,716,312 | B2 * | 5/2010 | Gamble | 709/223 |
| 7,747,021 | B2 * | 6/2010 | Lindteigen et al. | 380/274 |
| 7,751,383 | B2 * | 7/2010 | Chee et al. | 370/352 |
| 7,774,693 | B2 * | 8/2010 | Bodin et al. | 715/200 |
| 2002/0098885 | A1 * | 7/2002 | Sakaguchi | 463/31 |
| 2002/0178222 | A1 * | 11/2002 | O'Hara et al. | 709/205 |
| 2002/0184209 | A1 * | 12/2002 | Sato et al. | 707/5 |
| 2003/0020757 | A1 * | 1/2003 | Aratani et al. | 345/790 |
| 2003/0112259 | A1 * | 6/2003 | Kinjo | 345/700 |
| 2003/0174202 | A1 * | 9/2003 | Eshkoli et al. | 348/14.08 |
| 2004/0015553 | A1 * | 1/2004 | Griffin et al. | 709/206 |
| 2004/0039779 | A1 * | 2/2004 | Amstrong et al. | 709/204 |
| 2004/0174340 | A1 * | 9/2004 | Bruneau et al. | 345/167 |
| 2004/0225416 | A1 * | 11/2004 | Kubota et al. | 701/1 |
| 2005/0122922 | A1 * | 6/2005 | Wu et al. | 370/310 |
| 2005/0122923 | A1 * | 6/2005 | Jang et al. | 370/310 |
| 2005/0131673 | A1 * | 6/2005 | Koizumi et al. | 704/2 |
| 2005/0135348 | A1 * | 6/2005 | Staack | 370/353 |
| 2005/0137872 | A1 * | 6/2005 | Brady | 704/269 |
| 2005/0164684 | A1 * | 7/2005 | Chen et al. | 455/414.1 |
| 2005/0193343 | A1 * | 9/2005 | Kawabe et al. | 715/716 |
| 2005/0273700 | A1 * | 12/2005 | Champion et al. | 715/512 |
| 2006/0025122 | A1 * | 2/2006 | Harris et al. | 455/419 |
| 2006/0034042 | A1 * | 2/2006 | Hisano et al. | 361/681 |
| 2006/0035630 | A1 * | 2/2006 | Morishima et al. | 455/416 |
| 2006/0095469 | A1 * | 5/2006 | Willy et al. | 707/104.1 |
| 2006/0200540 | A1 * | 9/2006 | Morishima et al. | 709/220 |
| 2006/0242239 | A1 * | 10/2006 | Morishima et al. | 709/204 |
| 2006/0276213 | A1 * | 12/2006 | Gottschalk et al. | 455/518 |
| 2007/0040892 | A1 * | 2/2007 | Aoki et al. | 348/14.01 |
| 2007/0127670 | A1 * | 6/2007 | Morishima et al. | 379/202.01 |
| 2007/0171861 | A1 * | 7/2007 | Akhtar | 370/329 |
| 2007/0202906 | A1 * | 8/2007 | Lindner | 455/518 |
| 2008/0056570 | A1 * | 3/2008 | Williams et al. | 382/173 |
| 2008/0136897 | A1 * | 6/2008 | Morishima et al. | 348/14.08 |
| 2008/0187143 | A1 * | 8/2008 | Mak-Fan | 381/17 |
| 2009/0046139 | A1 * | 2/2009 | Cutler et al. | 348/14.08 |
| 2009/0100355 | A1 * | 4/2009 | Takemura et al. | 715/757 |
| 2009/0261987 | A1 * | 10/2009 | Sun | 340/870.07 |
| 2010/0048235 | A1 * | 2/2010 | Dai et al. | 455/518 |
| 2010/0057879 | A1 * | 3/2010 | Buchheit et al. | 709/206 |
| 2010/0194715 | A1 * | 8/2010 | Hurley et al. | 345/179 |

FOREIGN PATENT DOCUMENTS

| | | |
|---|---|---|
| JP | 10-116168 | 5/1998 |
| JP | 2001-306202 | 11/2001 |
| JP | 2003-526275 | 9/2003 |
| WO | WO 01/95151 A1 | 12/2001 |

* cited by examiner

PUSH-TO-TALK OVER CELLULAR SYSTEM, PORTABLE TERMINAL, SERVER APPARATUS, POINTER DISPLAY METHOD, AND PROGRAM THEREOF

TECHNICAL FIELD

The present invention relates to a PoC (Push-to-talk over Cellular) system, a PoC server, a PoC portable terminal, a pointer display method used therefor, and a program thereof, and more particularly to a method of displaying a pointer on a screen of a PoC portable terminal.

BACKGROUND ART

In this type of PoC systems, one-to-many telephone conversation can be made with use of packet networks (see published Japanese patent translation No. 2003-526275, for example). However, two or more persons cannot speak simultaneously. One who wants to speak has to wait for a currently speaking person to finish his/her speaking, then gets the right of speaking, and begins to speak.

The way to use portable terminals in PoC communication is similar to the way to use transceivers. When a speaker pushes down an exclusive key and holds it down, he/she obtains the right of speaking to transmit voice data of his/her speaking to other portable terminals. No one can speak with the other portable terminals, which can only receive the voice data. When the person who has the right of speaking releases the exclusive key, the right of speaking is released. A portable terminal in which the exclusive key is first pushed down after the right of speaking has been released gets the right of speaking, which allows speaking through that portable terminal.

The right of speaking in PoC is managed by a PoC server. The PoC server performs registration of members, recognition of participation availability information such as "absence" or "presence" of members, assignment of the right of speaking, and the like. The recognition of participation availability may be called as presence function. The assignment of the right of speaking may be called as floor control.

In PoC portable terminals used in the aforementioned PoC system, there is a method in which users make a group telephone conversation while they see screen information relating to the group telephone conversation on screens of their PoC portable terminals.

DISCLOSURE OF THE INVENTION

However, according to the aforementioned conventional PoC portable terminals, it is unable to edit or add information displayed on the screens of the PoC portable terminals while the group telephone conversation is being made.

Therefore, an object of the present invention is to provide a PoC system, a PoC portable terminal, a PoC server apparatus, a pointer display method used therefor, and a program thereof which can perform edit and add information on a display screen on which screen information relating to a group telephone conversation is displayed.

The present invention provides a PoC (Push-to-talk over Cellular) system comprising a PoC portable terminal capable of a group telephone conversation substantially in the same manner as a transceiver and a PoC server for managing a right of speaking in the PoC portable terminal, wherein: the PoC portable terminal comprises a radio part for receiving data of a common image to be displayed on terminals in the same group from the PoC server; a display part for displaying the common image data and a marker specifying a portion of the common image; an input part for receiving an input for display of the marker; and a control part for controlling display of the marker on the display part according to the input when the PoC portable terminal has the right of speaking, the radio part transmitting data for the marker to the PoC server, and the PoC server transmits the data for the marker to another PoC portable terminal in a group that is the same as that of an originating PoC portable terminal according to receipt of the marker.

For example, a pointing device or a touch panel may be used as the input part. When the input part includes a pointing device, for example, the data for the marker may include position data on the common image. When the input part includes a touch panel, for example, the data for the marker may include data specifying a component of the common image.

The input part may have a part for receiving a voice input, a part for recognizing the inputted voice, and a part for comparing a text included in a common screen with a text represented by the recognized voice, and may receive an input for display of the marker based on the comparison result.

The method of displaying the marker includes displaying the marker as a pointer for specifying a position on the common screen, displaying the marker as a line drawn along a partial or whole circumference of a component in the common screen, and displaying the marker with changing a display form of a component in the common screen. For example, the change of a display form includes a change of a font, a change of a text color, a change of a text size, a reversing display, and the like.

Furthermore, the present invention provides a PoC (Push-to-talk over Cellular) portable terminal capable of a group telephone conversation substantially in the same manner as a transceiver, comprising: a radio part for receiving data of a common image to be displayed on terminals in the same group from a PoC server for managing a right of speaking in a plurality of PoC portable terminals in the same group; a display part for displaying the common image data and a marker specifying a portion of the common image; an input part for receiving an input for display of the marker; and a control part for controlling display of the marker on the display part according to the input when the PoC portable terminal has the right of speaking, the radio part transmitting data for the marker to the PoC server.

The above features are focused on operation performed with the right of speaking. When attention is paid to operation performed without the right of speaking, the present invention has the following features. Specifically, in the aforementioned PoC portable terminal, the radio part receives the data for the marker from the other PoC portable terminal in the same group via the PoC server. The control part controls display of the marker on the display part according to the received data for the marker when the PoC portable terminal does not have the right of speaking.

Furthermore, the present invention provides a pointer display method used in a PoC (Push-to-talk over Cellular) portable terminal in a PoC system comprising a PoC portable terminal capable of a group telephone conversation substantially in the same manner as a transceiver and a PoC server for managing a right of speaking in the PoC portable terminal, comprising: a step in which a terminal A as a PoC portable terminal receives data of a common image to be displayed on terminals in the same group from the PoC server; a step in which the terminal A displays the common image data; a step in which the terminal A gets the right of speaking; a marker input step in which the terminal A receives an input for display of a marker specifying a portion of the common image; a step in which the terminal A displays the marker according to the input and transmits data Dm for the marker to the PoC server; a step in which the PoC server transmits the data Dm received from the terminal A to a terminal B as a PoC portable terminal other than the terminal A in the same group; a step in which the terminal B displays the marker according to the data Dm; and a step in which the terminal A releases the right of speaking.

For example, the data Dm may include one of position data on the common screen, data specifying a component of the common image, and the like. When the data Dm includes position data on the common screen, for example, a pointing device may be used as an input device of the PoC portable terminal. When the data Dm includes data specifying a component of the common image, for example a touch panel may be used as an input device of the PoC portable terminal.

The marker input step may include a step in which the terminal A receives a voice input, a step in which the terminal A recognizes the inputted voice, a step in which the terminal A compares a text included in a common screen with a text represented by the recognized voice, and a step in which the terminal A receives an input for display of the marker based on the comparison result.

For example, the marker may be displayed as one of a pointer for specifying a position on the common screen, a line drawn along a partial or whole circumference of a component in the common screen, and a change of a display form of a component in the common screen.

Furthermore, the present invention provides a computer program for controlling operation of a PoC (Push-to-talk over Cellular) portable terminal capable of a group telephone conversation substantially in the same manner as a transceiver by executing a procedure with a control computer of the PoC portable terminal, said procedure comprising: process of receiving data of a common image to be displayed on all PoC portable terminals in the same group from the PoC server; a process of displaying the common image data; a process of getting the right of speaking; a marker input process of receiving an input for display of a marker specifying a portion of the common image; and a process of displaying the marker according to the input and transmitting data Dm for the marker to the PoC server.

This computer program may execute, with the control computer, a process of releasing the right of speaking, a process of receiving data Dm' for the marker that the PoC server has received from the other PoC portable terminal from the PoC server, and a process of displaying the marker according to the data Dm'.

Furthermore, the present invention provides a PoC (Push-to-talk over Cellular) server apparatus for managing a right of speaking in a PoC portable terminal capable of a group telephone conversation substantially in the same manner as a transceiver, comprising: means for transmitting data of a common image to be displayed on terminals in the same group to all PoC portable terminals in the group; means for receiving data for a marker specifying a portion of the common image from the PoC portable terminal having the right of speaking in the group; and means for transmitting the data for the marker to another PoC portable terminal in the same group as an originating PoC portable terminal.

As with a general server apparatus, components of the PoC server are implemented by a CPU, a memory, a network interface device, a data bus interconnecting these components, and a computer program executed by the CPU for controlling the server apparatus.

For example, the data for the marker may be data representing a position on the common image or data specifying a component of the common image.

The data for the marker may represent a text specified in a text included in the common image by voice recognition.

A PoC portable terminal according to the present invention allows a person who pushes a PoC button (a person who gets the right of speaking) to add a pointer as a marker to common image data displayed on a portable terminal in a group during a group telephone conversation. The added marker is displayed on screen displays of portable terminals in the group.

A pointer display method according to the present invention includes pointer display with use of a pointing device, display with use of a touch panel, display with searching for common language in a screen display to voice of a person who has pushed the button and changing a font color of the searched language, and the like.

Thus, with the pointer display method according to the present invention, the owners of the portable terminals in the group other than one who has pushed the button can readily understand the master side's intention such as which part of the screen the master side is describing or what the master side is emphasizing, by seeing the display screens to which the pointer has been added. Therefore, with the pointer display method according to the present invention, edit and information addition can be performed on the display screens on which screen information relating to the group telephone conversation is displayed.

With the following configuration and operation, the present invention can exhibit an effect that edit and information addition can be performed on a display screen on which screen information relating to a group telephone conversation is displayed.

BEST MODE FOR CARRYING OUT THE INVENTION

Figure 1:
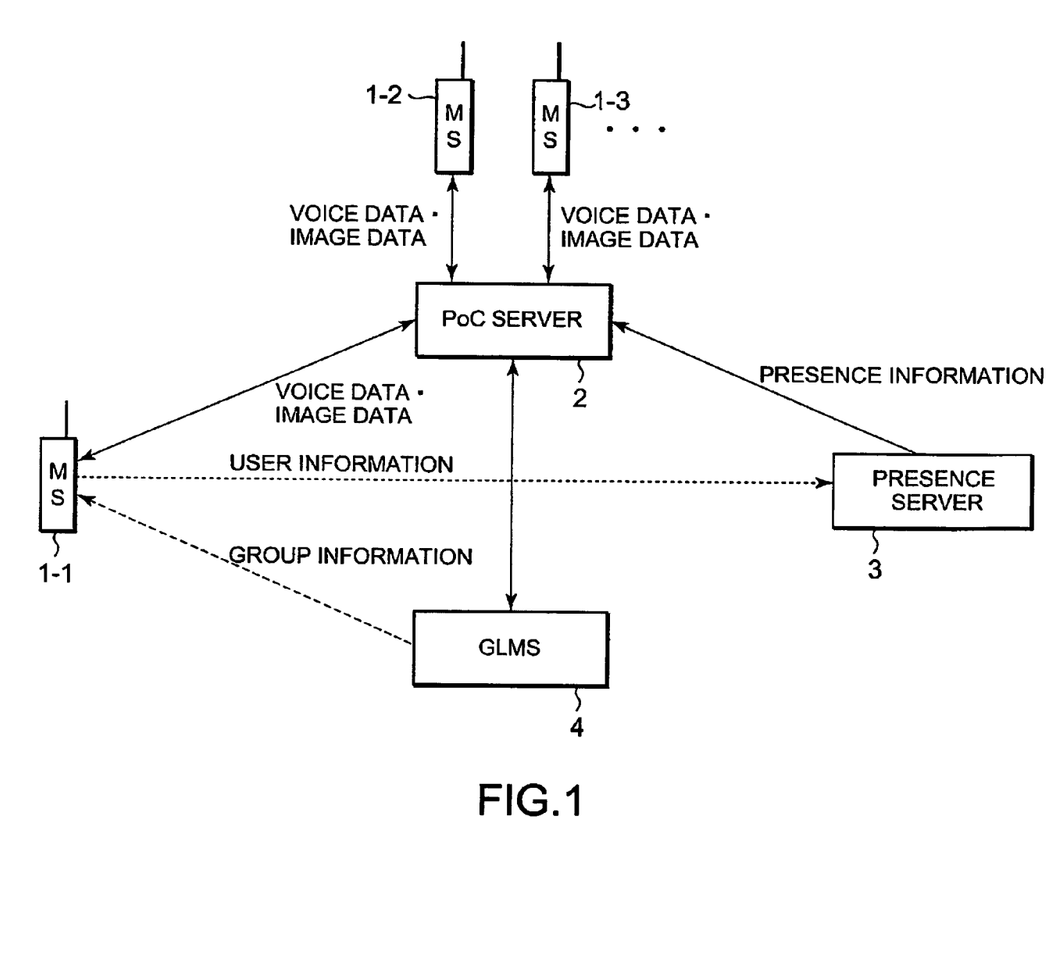
FIG. 1 is a block diagram showing an arrangement of a PoC system according to an embodiment of the present invention.

Next, embodiments of the present invention will be described with reference to the drawings. FIG. 1 is a block diagram showing an arrangement of a PoC (Push-to-talk over Cellular) system according to an embodiment of the present invention. In FIG. 1, the PoC system according to the embodiment of the present invention is formed by a user's portable terminal (MS#1) 1-1, another portable terminal (MS#2) 1-2 in the same group, another portable terminal (MS#3) 1-3 in the same group, a PoC server 2, a presence server 3, and a GLMS (Group and List Management Server) 4.

The PoC server 2 manages voice data and image data of the portable terminals 1-1, 1-2, and 1-3, receives and transmits terminal data of the respective portable terminals 1-1, 1-2, and 1-3. The presence server 3 serves as a user information database for the portable terminal 1-1 and transmits information of the user to the PoC server 2. The GLMS 4 serves as a user information database for the other portable terminals 1-2 and 1-3 in the same group and transmits information of the users in the same group to the user portable terminal 1-1.

The embodiment of the present invention allows a portable terminal 1-1 (master side) of a person who has pushed a PoC button (a person who has gotten the right of speaking) to add a pointer as a marker to common image data to be displayed on the portable terminals 1-1 to 1-3 in the aforementioned group during a telephone conversation in the group. The added marker is displayed on display screens of the portable terminals 1-1 to 1-3 in the group.

Thus, according to the embodiment of the present invention, the owners of the portable terminals in the group other than one who has pushed the button can readily understand the master side's intention such as which part of the screen the master side is describing or what the master side is emphasizing, by seeing the display screens to which the pointer has been added. Therefore, according to the embodiment of the present invention, edit and information addition can be performed on the display screens on which screen information relating to the group telephone conversation is displayed.

In the embodiment of the present invention, a display method of a pointer includes pointer display with use of a pointing device, display with use of a touch panel, display with searching for common language in a screen display to voice of a person who has pushed the button and changing a font color of the searched language, and the like.

Figure 2:
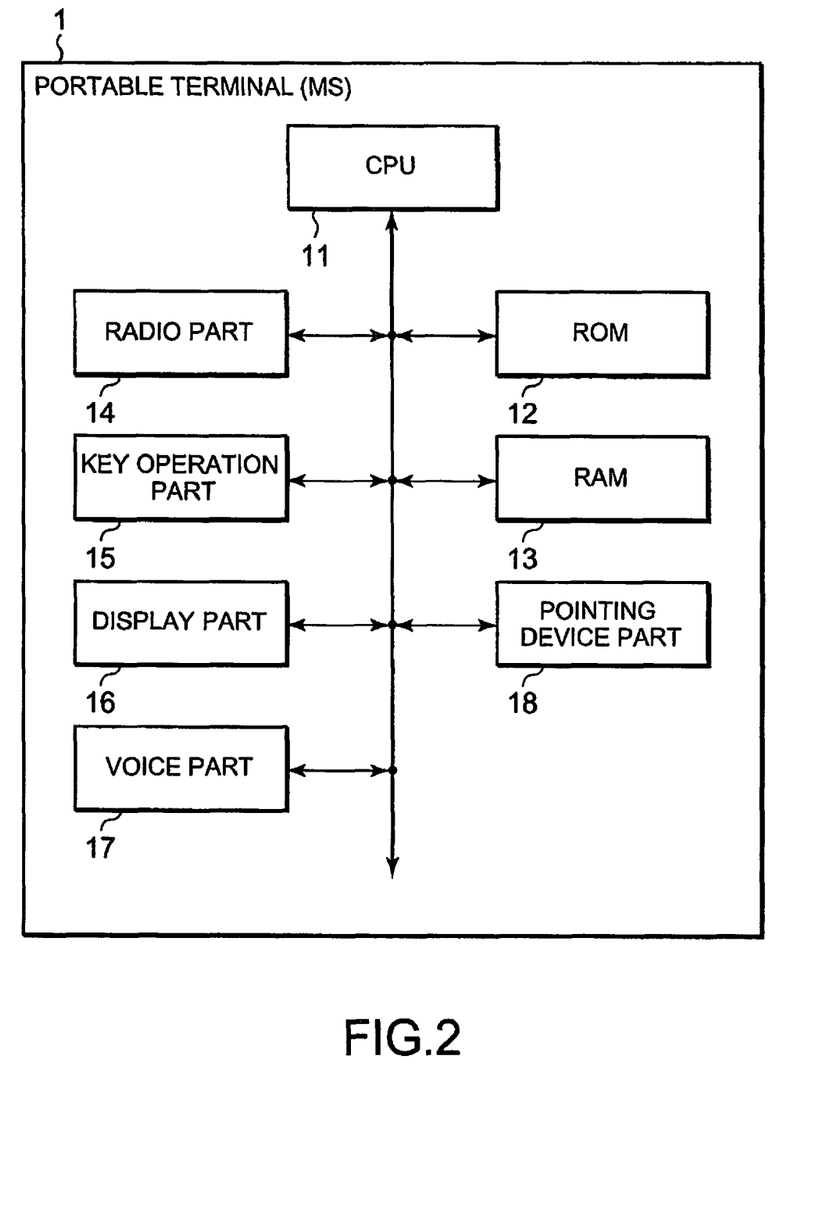
FIG. 2 is a block diagram showing an arrangement of a portable terminal according to a first example of the present invention.

FIG. 2 is a block diagram showing an arrangement of a portable terminal according to a first example of the present invention. In FIG. 2, a PoC system according to the first example of the present invention has the same arrangement as the PoC system according to the embodiment of the present invention shown in FIG. 1. A portable terminal 1 shown in FIG. 2 corresponds to each of the portable terminals 1-1 to 1-3 shown in FIG. 1.

The portable terminal 1 is formed by a CPU (Central Processing Unit) 11, a ROM (Read Only Memory) 12, a RAM (Random Access Memory) 13, a radio part 14, a key operation part 15, a display part 16, a voice part 17, and a pointing device part 18.

The CPU 11 has an arithmetic processing function for the entire portable terminal 1. The ROM 12 stores a control program for the CPU 11. The RAM 13 has a function of providing a work area for the CPU 11. The radio part 14 transmits voice data, image data, and marker information data to the PoC server 2, receives them from the PoC server 2, transmits user information to the presence server 3, and receives group information from the GLMS 6.

The key operation part 15 has a function for addition of a push button (not shown) to be used during a telephone conversation in the group. The display part 16 has a function of displaying common images in the group and information of a pointer as a marker. The voice part 17 has a function of processing voice data during a telephone conversation in the group. The pointing device part 18 displays a marker in a screen. For example, an analog pointing device such as Neuropointer (registered trademark) may be used as the pointing device part 18. Details of operation of Neuropointer have widely been known and are omitted herein.

Figure 3A:
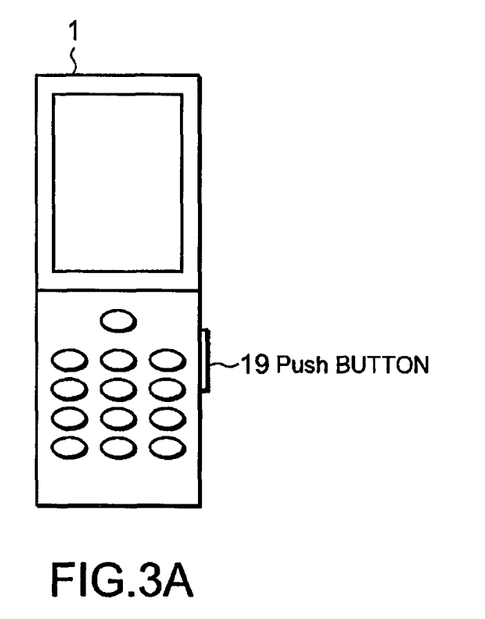
FIGS. 3A and 3B are views showing an external appearance of the portable terminal shown in FIG. 2.
Figure 3B:
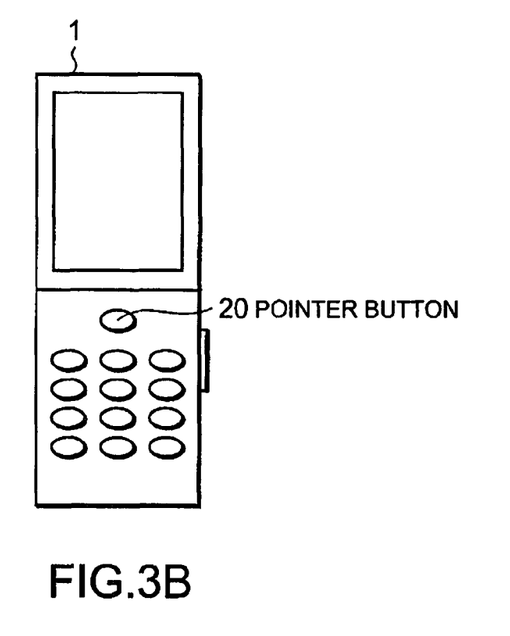
Figure 4:
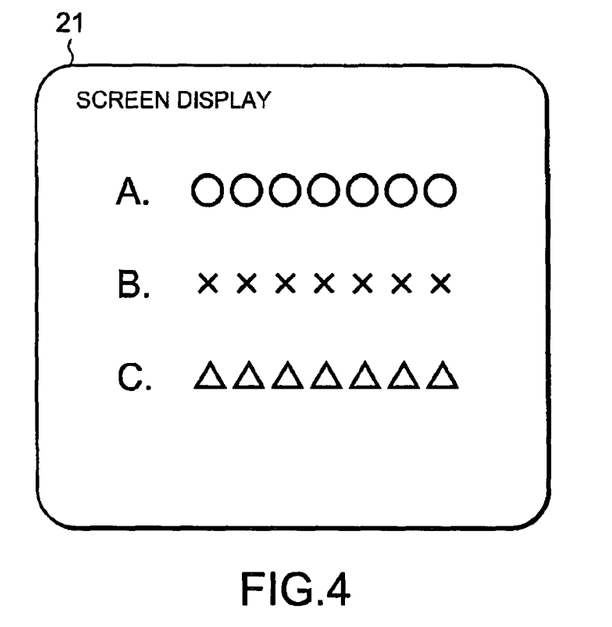
FIG. 4 is a view showing a display screen of the portable terminal shown in FIG. 2.
Figure 5:
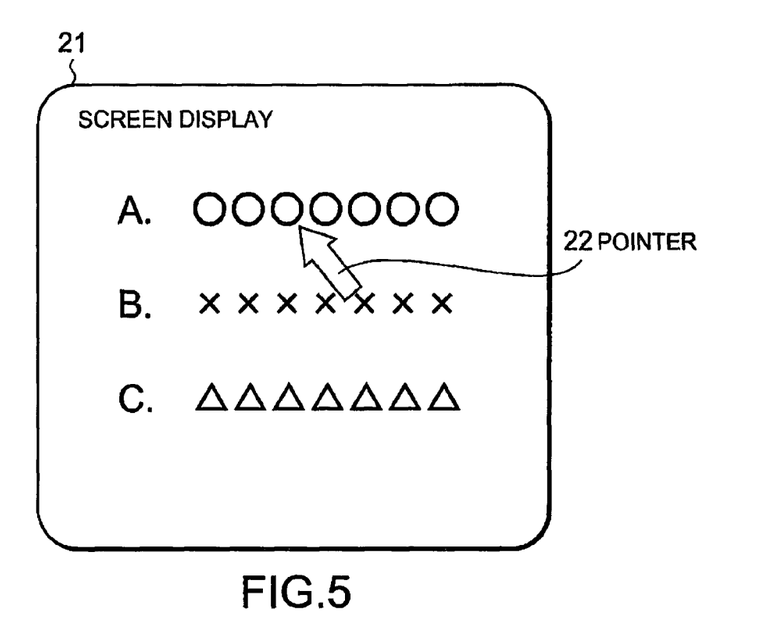
FIG. 5 is a view showing a display screen of the portable terminal shown in FIG. 2.
Figure 6:
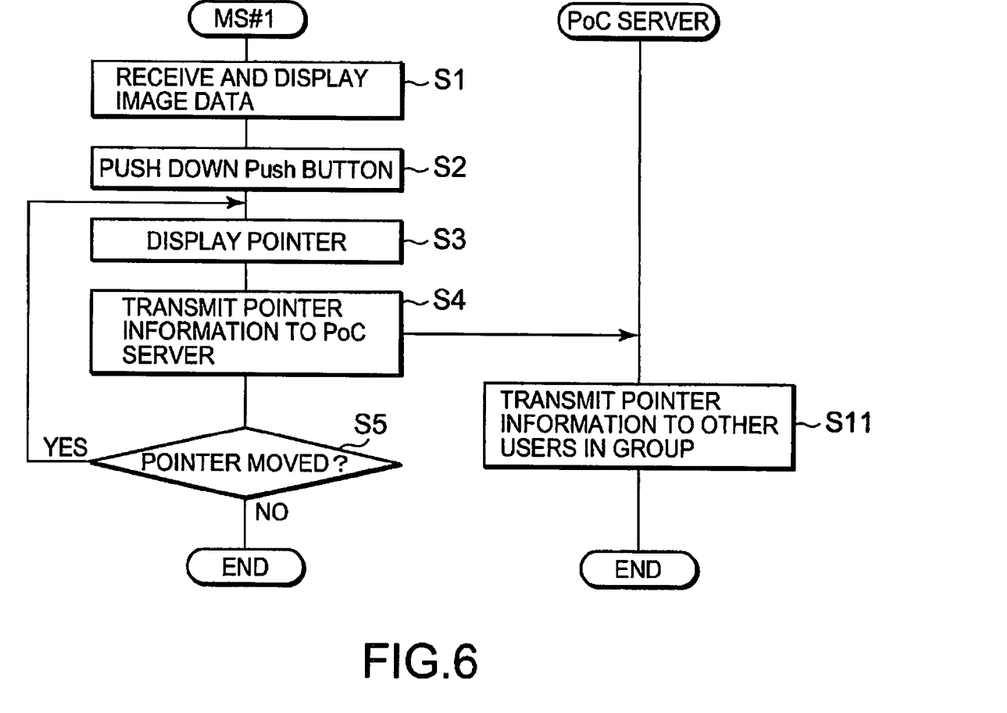
FIG. 6 is a flow chart showing an operation of a PoC system according to the first example of the present invention.

FIGS. 3A and 3B are views showing an external appearance of the portable terminal 1 shown in FIG. 2. FIGS. 4 and 5 are views showing a display screen of the portable terminal 1 shown in FIG. 2. FIG. 6 is a flow chart showing an operation of the PoC system according to the first example of the present invention. Operation of the PoC system according to the first example of the present invention will be described with reference to FIGS. 1 to 6. The processes shown in FIG. 6 are implemented by the CPU 11 executing a program stored in the ROM 12.

In FIG. 3A, the portable terminal 1 has a push button 19 needed to speak (to become a master side) during a group telephone conversation (see FIG. 3A) and a pointer button 20 needed to display a pointer as a marker (see FIG. 3B).

In an initial state of a group telephone conversation, all of the portable terminals in the group have previously received image data to show a screen display 21 in FIG. 4 from the PoC server 2. When a user having a telephone conversation in the group pushes down the push button 19 to become a master side and then pushes down the pointer button 20, the screen display is converted into a display screen 21 including a pointer 22 as a marker as shown in FIG. 5. The pointer information is sent to other users via the PoC server 2. Accordingly, the screen displays of the other users' portable terminals (1-2 and 1-3 in FIG. 1) are also converted into the display screens 21 as shown in FIG. 5.

First, when the portable terminal 1-1 receives image data from the radio part 14, it displays the image data on the display part 16 (Step S1 in FIG. 6). Subsequently, when the push button 19 of the key operation part 15 is pushed down, the portable terminal 1-1 becomes a master side (Step S2 in FIG. 6).

Furthermore, the portable terminal 1-1 displays pointer information of a marker, which is outputted by the pointing device part 18, on the display part 16 (Step S3 in FIG. 6). The portable terminal 1-1 transmits the pointer information obtained in Step S3 from the radio part 14 to the PoC server 2 (Step S4 in FIG. 6).

Next, the PoC server 2 sends the pointer information from the portable terminal 1-1 to the other users' portable terminals 1-2 and 1-3 in the group (Step S11 in FIG. 6). If the pointer is moved, then the portable terminal 1-1 as a master side repeats the aforementioned Steps S3 and S4 (Step S5 in FIG. 6).

Thus, in this example, the owners of the portable terminals 1-2 and 1-3 in the group other than one who has pushed the push button 19 can readily understand the master side's intention such as which part of the screen the master side is describing or what the master side is emphasizing, by seeing the display screens 21 to which the pointer has been added.

Figure 7:
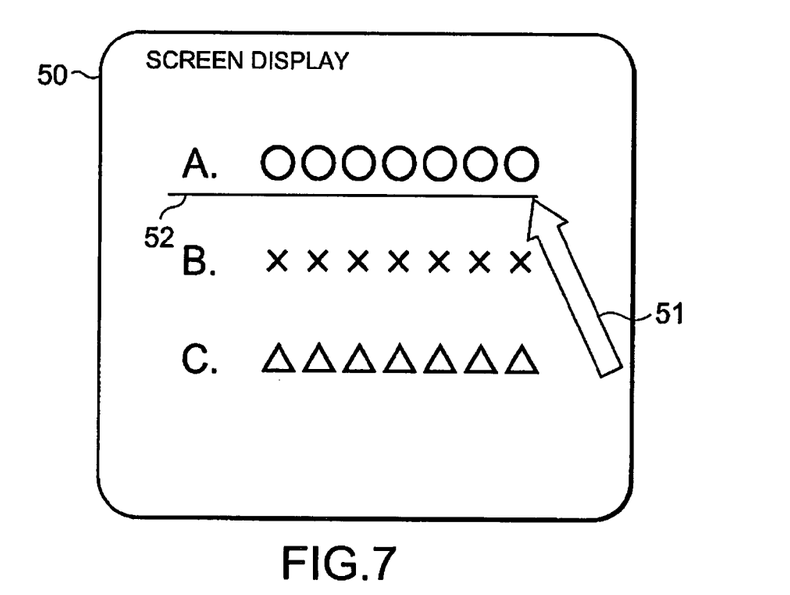
FIG. 7 is a view showing a display screen of a portable terminal according to another example of the present invention.

FIG. 7 is a view showing a display screen of a portable terminal according to another example of the present invention. In FIG. 7, a marker (underline) 52 can be drawn with a pencil-type tool 51 on a display screen 50 according to the other example of the present invention. That is, the display screen 50 is formed by a touch panel.

Figure 8:
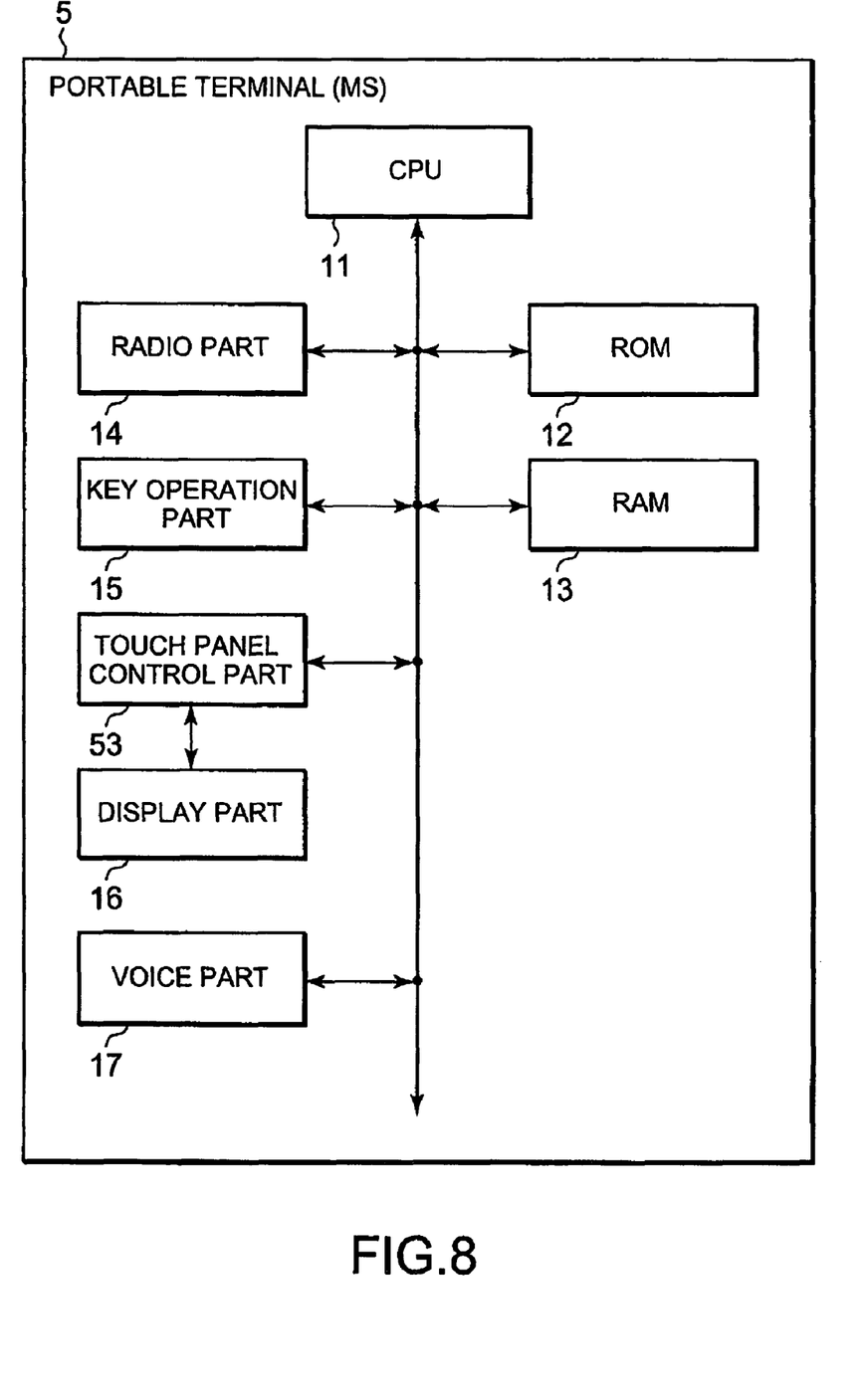
FIG. 8 is a block diagram showing an arrangement of the portable terminal according to the other example of the present invention.

FIG. 8 is a block diagram showing an arrangement of the portable terminal according to the other example of the present invention. In FIG. 8, the portable terminal 5 according to the other example of the present invention has the same arrangement as the first example of the present invention shown in FIG. 2 except that a touch panel control part 53 is provided instead of the pointing device part 18. The same components are denoted by the same reference numerals. Furthermore, operations of the same components are the same as those in the first example of the present invention. However, the display part 16, i.e., the display screen 50, is formed by a touch panel.

In FIG. 8, a PoC system according to the other example of the present invention has the same arrangement as the PoC system according to the embodiment of the present invention shown in FIG. 1. The portable terminal 5 shown in FIG. 8 corresponds to each of the portable terminals 1-1 to 1-3 shown in FIG. 1.

When a marker (underline) 52 is drawn on the display screen 50 with the aforementioned pencil-type tool 51, the touch panel control part 53 acquires the marker (underline) 52 as touch panel marker information on the display screen 50.

Figure 9:
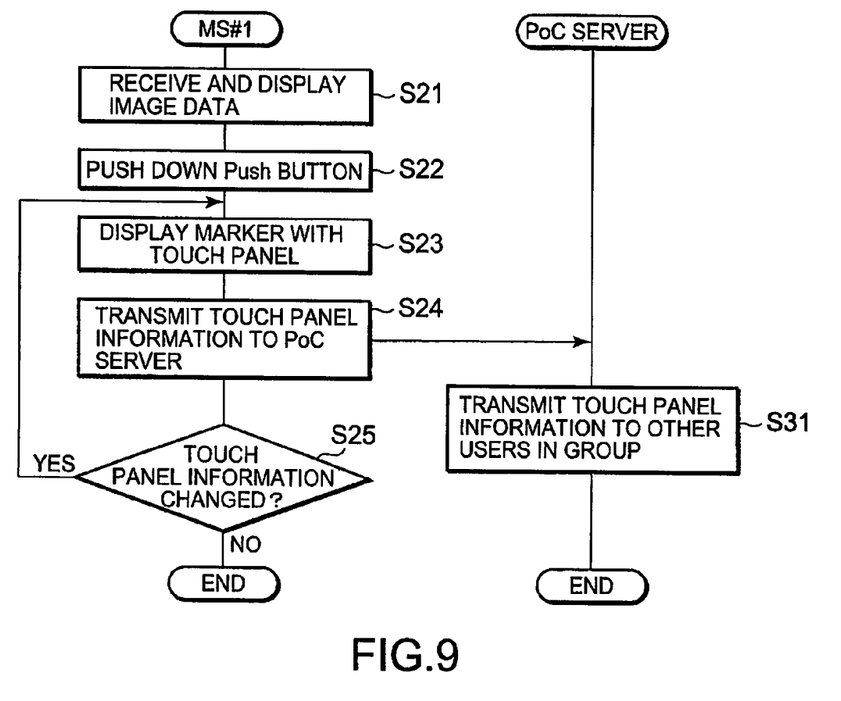
FIG. 9 is a flow chart showing an operation of a PoC system according to the other example of the present invention.

FIG. 9 is a flow chart showing an operation of a PoC system according to the other example of the present invention. Operation of the PoC system according to the other example of the present invention will be described with reference to FIGS. 7 to 9. The other example of the present invention has the same operation as the operation of the PoC system according to the aforementioned first example of the present invention except that the pointer information used in the first example of the present invention is changed to touch panel information. The processes shown in FIG. 9 are implemented by the CPU 11 executing a program stored in the ROM 12.

First, when the portable terminal 1-1 receives image data from the radio part 14, it displays the image data on the display part 16 (Step S21 in FIG. 9). Subsequently, when the push button 19 of the key operation part 15 is pushed down, the portable terminal 1-1 becomes a master side (Step S22 in FIG. 9).

Furthermore, the portable terminal 1-1 displays touch panel marker information, which has been acquired by the touch panel control part 53, on the display part 16 (Step S23 in FIG. 9). The portable terminal 1-1 transmits the touch panel information obtained in Step S23 from the radio part 14 to the PoC server 2 (Step S24 in FIG. 9).

Next, the PoC server 2 sends the touch panel information from the portable terminal 1-1 to the other users' portable terminals 1-2 and 1-3 in the group (Step S31 in FIG. 9). If the touch panel information is changed, then the portable terminal 1-1 as a master side repeats the aforementioned Steps S23 and S24 (Step S25 in FIG. 9).

Thus, in this example, the owners of the portable terminals 1-2 and 1-3 in the group other than one who has pushed the push button 19 can readily understand the master side's intention such as which part of the screen the master side is describing or what the master side is emphasizing, by seeing the display screens 50 to which the touch panel information has been added.

Three selectable objects may be displayed beforehand on the display screen 50. Areas are set in the touch panel so as to correspond to the objects. If an input is provided to any one of the areas by the pencil-type tool 51 or a finger, then the CPU 11 accordingly underlines the corresponding object and transmits an identifier specifying the selected object to the PoC server 2. The PoC server 2 transmits the received identifier to the other portable terminals in the group. Each of the other portable terminals underlines the object specified by the received identifier.

Figure 10:
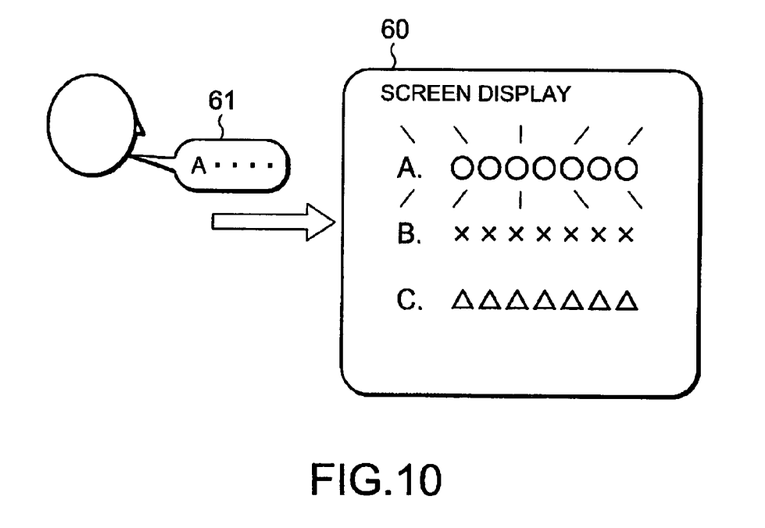
FIG. 10 is a view showing a display screen of a portable terminal according to another example of the present invention.

FIG. 10 is a view showing a display screen of a portable terminal according to another example of the present invention. In FIG. 10, a font of a row corresponding to master side user's spoken words 61 ("A . . . ") is changed in a display screen 60 according to the other example of the present invention.

Figure 11:
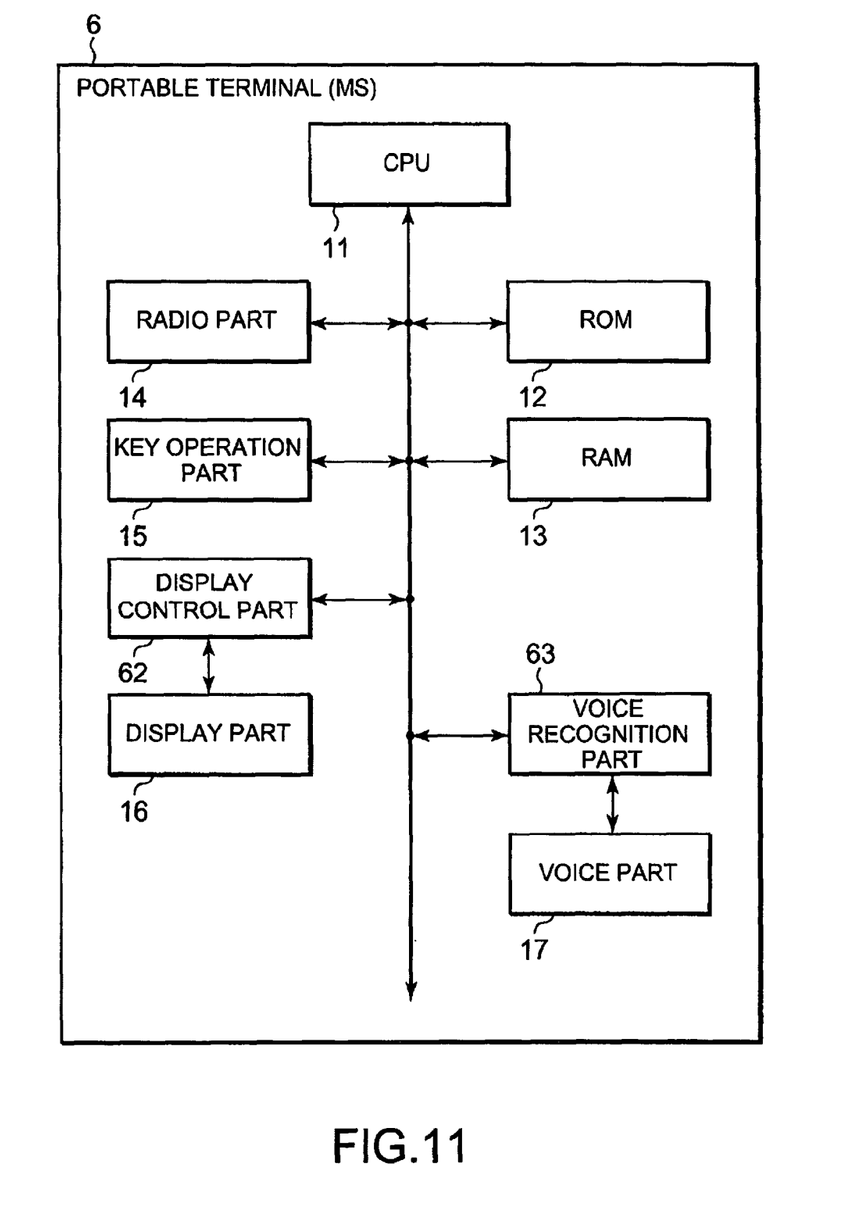
FIG. 11 is a block diagram showing an arrangement of the portable terminal according to the other example of the present invention.

FIG. 11 is a block diagram showing an arrangement of the portable terminal according to the other example of the present invention. In FIG. 11, the portable terminal 6 according to the other example of the present invention has the same arrangement as the first example of the present invention shown in FIG. 2 except that a display control part 62 and a voice recognition part 63 are provided instead of the pointing device part 18. The same components are denoted by the same reference numerals. Furthermore, operations of the same components are the same as those in the first example of the present invention. In FIG. 11, a PoC system according to the other example of the present invention has the same arrangement as the PoC system according to the embodiment of the present invention shown in FIG. 1. The portable terminal 6 shown in FIG. 11 corresponds to each of the portable terminals 1-1 to 1-3 shown in FIG. 1.

The display control part 62 changes a font color of a partial text displayed on the display screen 60. The voice recognition part 63 converts voice inputted via the voice part 17 into text information.

Figure 12:
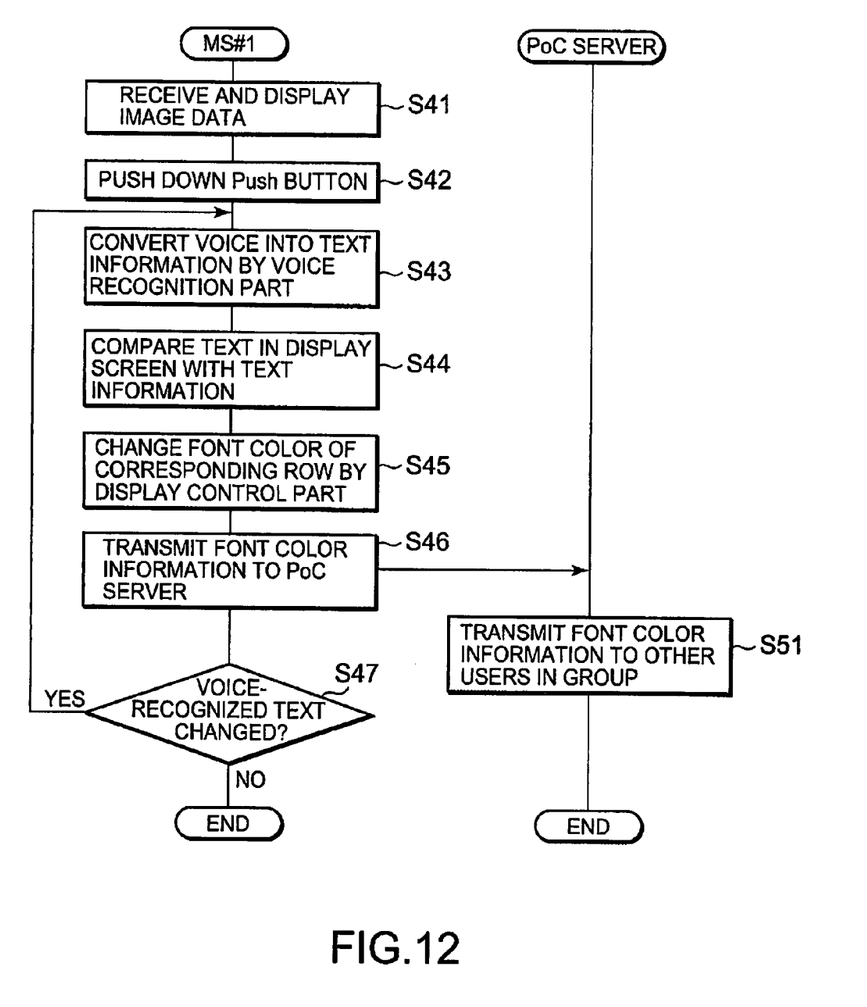
FIG. 12 is a flow chart showing an operation of a PoC system according to the other example of the present invention.

FIG. 12 is a flow chart showing an operation of a PoC system according to the other example of the present invention. Operation of the PoC system according to the other example of the present invention will be described with reference to FIGS. 10 to 12. The processes shown in FIG. 12 are implemented by the CPU 11 executing a program stored in the ROM 12.

First, when the portable terminal 1-1 receives image data from the radio part 14, it displays the image data on the display part 16 (Step S41 in FIG. 12). Subsequently, when the push button 19 of the key operation part 15 is pushed down, the portable terminal 1-1 becomes a master side (Step S42 in FIG. 12).

Then, when the user makes voice, the voice recognition part 63 of the portable terminal 1-1 converts the voice into text information (Step S43 in FIG. 12). The CPU 11 of the portable terminal 1-1 retrieves a text corresponding to the text information obtained in Step 43 from texts previously specified for each row of the display screen 60 (Step S44 in FIG. 12).

The display control part 62 of the portable terminal 1-1 changes a font color of the text of the row retrieved in Step S44 by the CPU 11 (Step S45 in FIG. 12). The radio part 14 of the portable terminal 1-1 transmits the font color information obtained in Step S45 to the PoC server 2 (Step S46 in FIG. 12).

The PoC server 2 transmits the font color information to the other users' portable terminals 1-2 and 1-3 in the group (Step S51 in FIG. 12). If the retrieved row is changed, then the portable terminal 1-1 as a master side repeats the aforementioned Steps S43 to S46 (Step S47 in FIG. 12).

Thus, in this example, the owners of the portable terminals 1-2 and 1-3 in the group other than one who has pushed the push button 19 can readily understand the master side's intention such as which part of the screen the master side is describing or what the master side is emphasizing, by changing a font color of a row corresponding to voice of one who has pushed the push button 19.

The invention claimed is:

1. A PoC (Push-to-talk over Cellular) system comprising:
a PoC portable terminal capable of a group telephone conversation substantially in the same manner as a transceiver; and
a PoC server for managing a right of speaking from a user of said PoC portable terminal in a telephone conversation group,
wherein said PoC portable terminal comprises:
a radio part for receiving data of a common image to be displayed on PoC terminals in said telephone conversation group from said PoC server;
a display part for displaying said common image data and a marker specifying a portion of said common image;
an input part for receiving an input for said display of said marker; and
a control part for controlling said display of said marker on said display part according to said input that is made through said input part while said user's PoC portable terminal has said right of speaking,
wherein said radio part transmits data Dm for said marker to said PoC server, and
wherein said PoC server transmits said data Dm of said marker to other users' PoC portable terminals if said marker is moved in the screen of said user's PoC terminal while said user's PoC terminal having said right of speaking in said telephone conversation group.

2. Said PoC system claimed in claim 1, wherein said input part comprises a pointing device or a touch panel.

3. Said PoC system claimed in claim 1, wherein said input part comprises:
means for receiving a voice input;
means for recognizing the inputted voice; and
means for comparing a text comprised in a common screen with a text represented by said recognized voice, and receives an input for display of said marker based on the comparison result.

4. Said PoC system claimed in claim 1, wherein said marker is played as one of a pointer for specifying a position on said common screen, a line drawn along a partial or whole circumference of a component in said common screen, and a change of a display form of a component in said common screen.

5. Said PoC system claimed in claim 1, wherein said marker is capable of movement for a substantial portion of a screen of said display part in accordance with an input operation by said input part on a master side of said PoC portable terminals, and
wherein said movement of said marker is included in said data Dm of said marker transmitted by said radio part.

6. Said PoC system claimed in claim 5, wherein said control part controlling said displaying of said movement of said marker is independent of said right of speaking between said PoC portable terminals.

7. The PoC system claimed in claim 1, wherein said radio part transmits data Dm of said marker to said PoC server including while said PoC portable terminal has said right of speaking.

8. A pointer display method used in a PoC (Push-to-talk over Cellular) portable terminal in a PoC system comprising a PoC portable terminal capable of a group telephone conversation substantially in the same manner as a transceiver and a PoC server for managing a right of speaking in said PoC portable terminal, said pointer display method comprising:
receiving, by a terminal A as a PoC portable terminal, data of a common image to be displayed on PoC terminals in a telephone conversation group from said PoC server;
displaying, by said terminal A, displays said common image data;
acquiring said right of speaking by said terminal A;
receiving, by said terminal A, an input for display of a marker specifying a portion of said common image;
displaying, by said terminal A, said marker according to input that is received by said terminal A while said terminal A has said right of speaking and transmitting data Dm of said marker to said PoC server;
transmitting, by said PoC server, said data Dm received from said terminal A to a terminal B as a PoC portable terminal other than said terminal A in said telephone conversation group;
displaying, by said terminal B, said marker according to said data Dm; and
releasing, by said terminal A, said right of speaking.

9. Said pointer display method claimed in claim 8, wherein said data Dm comprises one of position data on said common screen and data specifying a component of said common image.

10. Said pointer display method claimed in claim 8, wherein said receiving said input for display of said marker comprises:
receiving, by said terminal A, a voice input;
recognizing, by said terminal A the inputted voice;
comparing, by said terminal A, a text comprised in a common screen with a text represented by said recognized voice; and
receiving, by said terminal A, an input for display of said marker based on said comparison result.

11. Said pointer display method claimed in claim 8, wherein said marker is displayed as one of a pointer for specifying a position on said common screen, a line drawn along a partial or whole circumference of a component in said common screen, and a change of a display form of a component in said common screen.

12. A PoC (Push-to-talk over Cellular) portable terminal capable of a group telephone conversation substantially in the same manner as a transceiver, said PoC portable terminal comprising:
a radio part for receiving data of a common image to be displayed on terminals in a telephone conversation group from a PoC server for managing a right of speaking in a plurality of PoC portable terminals in a telephone conversation group;
a display part for displaying said common image data and a marker specifying a portion of said common image;
an input part for receiving an input for display of said marker; and
a control part for controlling display of said marker on said display part according to input that is made through said input part while said PoC portable terminal has said right of speaking, said radio part transmitting data Dm for said marker to said PoC server and said PoC server transmitting said data Dm of said marker to other users' PoC portable terminals if said marker is moved in the screen of said user's PoC portable terminal while said user's PoC portable terminal having said right of speaking in said telephone conversation group.

13. Said PoC portable terminal claimed in claim 5, wherein said input part comprises a pointing device or a touch panel.

14. Said PoC portable terminal claimed in claim 12, wherein said input part comprises:
means for receiving a voice input;
means for recognizing the inputted voice; and means for comparing a text comprised in a common screen with a text represented by said recognized voice, and receives an input for display of said marker based on said comparison result.

15. The PoC portable terminal claimed in claim 12, wherein said marker is displayed as one of a pointer for specifying a position on said common screen, a line drawn along a partial or whole circumference of a component in said common screen, and a change of a display form of a component in said common screen.

16. A computer readable non-transitory tangible medium storing a computer program for controlling operation of a PoC (Push-to-talk over Cellular) portable terminal capable of a group telephone conversation substantially in the same manner as a transceiver by executing a procedure with a control computer of said PoC portable terminal, said procedure comprising:
    a process of receiving data of a common image to be displayed on all PoC portable terminals in a telephone conversation group from a PoC server;
    a process of displaying said common image data in the screen of a user's PoC terminal;
    a process of getting a right of speaking from said user's PoC terminal;
    a marker input process of receiving an input for display of a marker specifying a portion of said common image; and
    a process of displaying said marker according to said input for display of said marker that is made while having said right of speaking and transmitting data Dm of said marker to said PoC server and said PoC server transmitting said data Dm of said marker to other users' PoC portable terminals if said marker is moved in the screen of said user's PoC portable terminal while said user's PoC portable terminal having said right of speaking in said telephone conversation group.

17. A PoC (Push-to-talk over Cellular) server apparatus for managing a right of speaking in a PoC portable terminal capable of a group telephone conversation substantially in the same manner as a transceiver, the PoC server apparatus comprising:
    means for transmitting data of a common image to be displayed on PoC terminals a telephone conversation group to all PoC portable terminals in said telephone conversation group;
    means for receiving data Dm of a marker specifying a portion of said common image from a user's PoC portable terminal having said right of speaking in said telephone conversation group; and
    means for transmitting said Dm data for the of said marker to another user's PoC portable terminal in said telephone conversation group;
    wherein said means for transmitting said data Dm for the of said marker to said another user's PoC portable terminal comprises means for transmitting said data Dm of said marker to other users' PoC portable terminals if said marker is moved in the screen of said user's PoC portable terminal while said user's PoC portable terminal having said right of speaking in said telephone conversation group.

18. The PoC server apparatus claimed in claim 17, wherein said data Dm of said marker comprises data representing a position on said common image or data specifying a component of said common image.

19. Said PoC server apparatus claimed in claim 17, wherein said data Dm of said marker represents a text specified in a text comprised in said common image by voice recognition.

\* \* \* \* \*